United States Patent [19]

Tsutsumi et al.

[11] Patent Number: 4,810,746

[45] Date of Patent: Mar. 7, 1989

[54] RUBBER COMPOSITION FOR USE IN VIBRATION INSULATING MATERIAL

[75] Inventors: Fumio Tsutsumi; Makoto Kondo; Mitsuhiko Sakakibara; Masaru Oda, all of Yokkaichi; Masaki Ogawa, Kodaira; Akira Tsuchikura, Chofu; Tatsuo Fujimaki, Higashimurayama, all of Japan

[73] Assignees: Bridgestone Tire Company Limited; Japan Synthetic Rubber Company Limited, both of Tokyo, Japan

[21] Appl. No.: 96,805

[22] Filed: Sep. 10, 1987

Related U.S. Application Data

[63] Continuation of Ser. No. 827,184, Feb. 6, 1986, abandoned, which is a continuation of Ser. No. 598,105, Apr. 9, 1984, abandoned.

[30] Foreign Application Priority Data

Apr. 8, 1983 [JP] Japan .................. 61029/83

[51] Int. Cl.$^4$ .................. C08K 3/04; C08L 7/00; C08L 9/02; C08L 9/06
[52] U.S. Cl. .................. 524/522; 524/518; 524/523; 524/526; 525/211; 525/221; 525/222; 525/236; 525/237
[58] Field of Search .................. 525/221, 211, 236, 237; 524/517, 526, 522, 518

[56] References Cited

U.S. PATENT DOCUMENTS

| 2,880,186 | 3/1959 | Barth | 525/221 |
| 4,218,349 | 4/1980 | Minatono et al. | 524/517 |
| 4,412,031 | 10/1983 | Kitahara et al. | 524/526 |

FOREIGN PATENT DOCUMENTS 693351 9/1964 Canada .................. 525/221

Primary Examiner—Allan M. Lieberman
Attorney, Agent, or Firm—Sughrue, Mion, Zinn, Macpeak, and Seas

[57] ABSTRACT

Disclosed herein is a rubber composition for use in vibration insulating material, which comprises as rubber components 5–50 parts by weight of a copolymer consisting of 99.5–45% by weight of a conjugated diolefin, 0.5–30% by weight of an ethylenically unsaturated carboxylic acid and 0–40% by weight of another vinly monomer polymerizable therewith, and 50–95 parts by weight of at least one rubber selected from natural rubber and synthetic diene rubbers. This rubber composition is excellent in the breaking properties and vibration insulating properties with a small temperature dependence of hysteresis loss.

9 Claims, No Drawings

RUBBER COMPOSITION FOR USE IN VIBRATION INSULATING MATERIAL

This is a continuation of application Ser. No. 827,184, filed Feb. 8, 1986, which is a continuation of application Ser. No. 598,105, filed Apr. 9, 1984, now both abandoned.

BACKGROUND OF THE INVENTION (1) Field of the Invention

The present invention relates to a rubber composition having good breaking properties, and excellent vibration insulating properties and wherein the temperature dependence of the hysteresis loss of which is small.

(2) Description of the Prior Art

Heretofore, there has been known butyl rubber as a rubber developing excellent vibration-insulating and -absorbing properties over the widest temperature range among the vibration insulating rubber materials. However, butyl rubber is poor in the breaking properties and compression set required as the vibration insulating rubber material. In order to satisfy the above requirements, therefore, it is attempted to blend butyl rubber with a synthetic diene rubber including natural rubber, but there is no covulcanization property between them and hence the breaking and compression set are not satisfactorily improved. As a result, such a rubber blend is naturally limited in the application as a rubber vibration insulator.

Under these circumstances, in the rubber industry, natural rubber, a synthetic diene rubber or a blend of other rubber therewith is used as a rubber vibration insulator by adding various plasticizers to provide the vibration absorbing property. In this case, however, the compression set reduces when intending to meet the vibration absorbing property, so that it is presently difficult to simultaneously satisfy both the properties.

Furthermore, it has been proposed to improve the vibration insulating properties by blending the above rubber with a polymer having a relatively high glass transition temperature Tg. In this case, however, the temperature dependence of hysteresis loss is large and the low temperature properties are disadvantageous, or the hysteresis loss becomes lower at high temperature, so that such a blend is restricted to application over a narrower temperature range.

With the recent developments in the automobile industry, the target value for the vibration absorbing property required for the rubber vibration insulator becomes severer year by year. Particularly, in the automobile parts to be used over a wider temperature range, it is demanded to develop materials for a rubber vibration insulator which have a small temperature dependence of the hysteresis loss and excellent vibration insulating properties without deteriorating other properties.

SUMMARY OF THE INVENTION

It is therefore an object of the invention to provide a rubber composition for use in vibration insulating material which is excellent in the vibration insulating properties and has good breaking properties and compression set.

According to the invention, there is provided a rubber composition for use in vibration insulating material, comprising as rubber components 5-50 parts by weight of a copolymer consisting of 99.5-45% by weight of a conjugated diolefin, 0.5-30% by weight of an ethylenically unsaturated carboxylic acid and 0-40% by weight of another vinyl monomer copolymerizable therewith, and 50-95 parts by weight of at least one rubber selected from the group consisting of natural rubber and synthetic diene rubbers.

DETAILED DESCRIPTION OF THE INVENTION

The copolymer to be used in the invention is obtained, for instance, by an emulsion polymerization or a solution polymerization using a radical initiator. As the radical initiator, mention may be made of potassium persulfate, sodium persulfate, azobisisobutyronitrile, an organic peroxide such as p-menthane hydroperoxide, benzoyl peroxide and the like, which is used alone or in combination with a reducing agent as a redox catalyst.

An an emulsifier to be used in the emulsion polymerization, use may be made of various anionic and cationic surfactants, among which alkylbenzensulfonate soap or alkylammonium soap is preferably used.

In case of the solution polymerization, toluene, benzene, cyclohexane or the like is used as a solvent.

As a molecular weight modifier, an alkyl mercaptan is ordinarilly used.

As the conjugated diolefin to be used in the invention, mention may be made of isoprene, butadiene, pentadiene or the like, among which isoprene is preferably used from the standpoint of the breaking properties. The content of the conjugated diolefin in the copolymer is 99.5-45% by weight, preferably 99-50% by weight. If the content of the conjugated diolefin is less than 45% by weight, the breaking properties and compression set are unfavorably deteriorated.

As the ethylenically unsaturated carboxylic acid, mention may be made of monocarboxylic acids and dicarboxylic acid such as acrylic acid, methacrylic acid, itaconic acid, cinnamic acid, fumaric acid, maleic acid and the like. The content of the ethylenically unsaturated carboxylic acid in the copolymer is 0.5-30% by weight, preferably 1-20% by weight. If the content of the ethylenically unsaturated carboxylic acid is less than 0.5% by weight, the hysteresis loss is small, while if it exceeds 30% by weight, the breaking properties lower and the compression set becomes large.

As the copolymerizable vinyl monomer, mention may be made of styrene, α-methylstyrene, vinyltoluene, p-methylstyrene, methyl acrylate, butyl acrylate, 2-ethylhexyl acrylate, methyl methacrylate, butyl methacrylate, 2-ethylhexyl methacrylate and the like. These vinyl monomers may be used in such an amount that they are existant in the copolymer at a ratio of not more than 40% by weight.

According to the invention, the molecular weight of the copolymer is not particularly restricted. When the copolymer having a molecular weight of 1,000-200,000 is used, it has a large effect for enhancing the hysteresis loss, so that a rubber composition having good vibration insulating properties can be obtained by blending a small amount of the above copolymer with the other rubber. Moreover, the molecular weight is determined from polystyrene molecular weight measured by a gel permeation chromatography. As the molecular weight of the copolymer becomes larger, the processability is inversely affected. In the latter case, it is preferable that the Mooney viscosity ($ML_{1+4}^{100°C.}$) of the copolymer is limited to not more than 100.

In the rubber composition according to the invention, the amount of the copolymer is 5-50 parts by weight, preferably 10–30 parts by weight based on 100 parts by weight of total rubber component. If the amount of the copolymer is less than 5 parts by weight, the hysteresis loss is small, while if it exceeds 50 parts by weight, the deterioration of breaking properties is large.

As the rubber to be blended with the copolymer, mention may be made of natural rubber, polyisoprene rubber, styrene-butadiene copolymer rubber, butadiene rubber, acrylonitrile-butadiene copolymer rubber, ethylene-propyrenediene terpolymer rubber and the like, among which natural rubber and polyisoprene rubber are preferably used.

If necessary, the rubber composition according to the invention is extended with oil, added with a filler, a vulcanizer, an additive and the like as ordinarily used, and vulcanized under usual conditions to be suitably used as a rubber vibration insulator.

The rebound resilience of the rubber composition for the vibration insulating material according to the invention is less than 60% as measured by a Dunlop tripsometer (BS 903) at 80° C., which exhibits good vibration insulating properties.

The rubber vibration insulator composed of the rubber composition according to the invention may be concretely employed as a mount of an engine, a bushing of an idler arm, a torsional damper and the like. Besides, such rubber composition can be used as a sidewall portion and a tread portion of a tire.

The following examples are given in illustration of the invention and are not intended as limitations thereof.

Moreover, the amount of carboxyl group-containing compound contained in the copolymer was determined by an acid-base titration method.

Further, the histeresis loss was evaluated by the rebound resilience, while the breaking properties were evaluated by the tensile strength and the elongation at break.

Examples 1–8; Comparative Examples 1–5:

Polymers A–J were prepared by the following polymerization method.

Polymer A:

Into a 5 l autoclave were charged water (1,900 g), potassium t-dodecylbenzenesulfonate (40 g), isoprene (950 g), methacrylic acid (50 g), dodecyl mercaptan (0.3 g) and potassium persulfate (10 g), and the polymerization was carried out at 60° C. after replacing the atmosphere in the autoclave with nitrogen. When the conversion degree for polymerization reached 70%, dimethylthiocarbamate was added to stop the polymerization, and further a phenolic antioxidant was added. The solidification and drying were carried out in the usual manner to obtain a polymer having a content of methacrylic acid of 4.8% by weight and $ML_{1+4}^{100°\ C.}$ of 35.

Polymer B:

A polymer was obtained by repeating the same procedure as in polymer A except that acrylic acid (50 g) was used instead of methacrylic acid (50 g). The content of acrylic acid was 4.0% by weight and $ML_{1+4}^{100°\ C.}$ was 26.

Polymer C:

A polymer was obtained by repeating the same procedure as in Polymer A except that isoprene (850 g), butyl acrylate (100 g) and acrylic acid (50 g) were used. The contents of acrylic acid and butyl acrylate were 4.5% by weight and 12% by weight, respectively and $ML_{1+4}^{100°\ C.}$ was 39.

Polymer D:

A polymer was obtained by repeating the same procedure as in polymer A except that butadiene (950 g), methacrylic acid (50 g) and t-dodecyl mercaptan (0.8 g) were used. The content of methacrylic acid was 5.1% by weight and $ML_{1+4}^{100°\ C.}$ was 42.

Polymer E:

A polymer was obtained by repeating the same procedure as in Polymer A except that isoprene (750 g), acrylic acid (250 g) and t-dodecyl mercaptan (0.5 g) were used. The content of acrylic acid was 19% by weight and $ML_{1+4}^{100°\ C.}$ was 35.

Polymer F:

A polymer was obtained by repeating the same procedure as in Polymer A except that isoprene (996 g) and acrylic acid (4 g) were used. The content of acrylic acid was 0.3% by weight and $ML_{1+4}^{100°\ C.}$ was 23.

Polymer G:

A polymer was obtained by repeating the same procedure as in Polymer A except that t-dodecyl mercaptan (5 g) was used. The content of methacrylic acid was 4.7% by weight and $ML_{1+4}^{100°\ C.}$ was less than 10.

Polymer H:

A polymer was obtained by repeating the same procedure as in Polymer A except that isoprene (550 g), acrylic acid (450 g) and t-dodecyl mercaptan (0.6 g) were used. The content of acrylic acid was 38% by weight and $ML_{1+4}^{100°\ C.}$ was 30.

Polymer I:

A polymer was obtained by repeating the same procedure as in Polymer A except that butadiene (700 g), styrene (270 g), methacrylic acid (30 g) and t-dodecyl mercaptan (30 g) were used. The contents of methacrylic acid and styrene were 2.9% by weight and 25% by weight, respectively and $ML_{1+4}^{100°\ C.}$ was less than 10.

Polymer J:

A polymer was obtained by repeating the same procedure as in Polymer A except that t-dodecyl mercaptan (30 g) was used. The content of methacrylic acid was 5.6% by weight and $ML_{1+4}^{100°\ C.}$ was less than 10.

In the following Table 1, there are shown the composition and $ML_{1+4}^{100°\ C.}$ of Polymers A–J. Each of these polymers was compounded with other ingredients according to a compounding recipe as shown in the following Table 2 by means of blast mill and roll and then vulcanized at 145° C. for 20 minutes. The properties of the resulting vulcanizate are shown in the following Table 3.

The breaking properties and compression set were measured according to JIS K 6301. The measuring conditions for the compression set were 100° C.×22 hours. The rebound resilience was measured by using the Dunlop tripsometer.

Comparative Example 1 is poor in the breaking properties, while Comparative Example 2 is poor in the breaking properties and compression set. In Comparative Example 3, the hysteresis loss is small and the vibration insulating properties lower. Comparative Example 4 is poor in the tensile strength and compression set, while in Comparative Example 5, the temperature dependence of the rebound resilience is large, the hysteresis loss is small at high temperature and the vibration insulating properties lower.

TABLE 1

| Sample | Copolymer composition (% by weight) | | | | | Mooney viscosity $MC_{1+4}^{100°C.}$ | Molecular weight $\overline{M}w$ (× 10$^4$) |
|---|---|---|---|---|---|---|---|
| | Isoprene | Butadiene | Butyl acrylate | Methacrylic acid | Acrylic acid | | |
| Polymer-A | 95.2 | — | — | 4.8 | — | 35 | 41.0 |
| Polymer-B | 96.0 | — | — | — | 4.0 | 26 | 32.0 |
| Polymer-C | 83.5 | — | 12.0 | — | 4.5 | 39 | 44.2 |
| Polymer-D | — | 94.9 | — | 5.1 | — | 42 | 48.1 |
| Polymer-E | 81.0 | — | — | — | 19.0 | 35 | — |
| Polymer-F | 99.7 | — | — | — | 0.3 | 23 | 27.1 |
| Polymer-G | 95.3 | — | — | 4.7 | — | 10> | 19.0 |
| Polymer-H | 62.0 | — | — | — | 38.0 | 30.0 | — |
| Polymer-I | 251 | 72.1 | — | 2.9 | — | 10> | 2.3 |
| Polymer-J | 95 | — | — | 5 | — | 10> | 1.5 |

TABLE 2

| Compounding recipe | |
|---|---|
| | Part by weight |
| Polymer | 100 |
| Carbon black HAF | 50 |
| Stearic acid | 2 |
| ZnO | 3 |
| Antioxidant 810 NA*[1] | 1 |
| Antioxidant TP*[2] | 0.8 |
| Vulcanization accelerator DPG*[3] | 0.6 |
| Vulcanization accelerator DM*[4] | 1.2 |
| Sulfur | 1.5 |

*[1]N—phenyl-N'—isopropyl-p-phenylenediamine
*[2]Sodiumdibutyldithiocarbamate
*[3]Diphenylguanidine
*[4]Dibenzothiazyldisulfide

TABLE 3

| | Polymer blend ratio (weight ratio) | Tensile strength (Kgf/cm$^2$) | Elongation at break (%) | Rebound resilience (Dunlop) (%) | | | Compression set (%) 100° C.-22 hr |
|---|---|---|---|---|---|---|---|
| | | | | 20° C. | 50° C. | 80° C. | |
| Example 1 | Polymer-A/NR = 20/80 | 270 | 420 | 47 | 53 | 57 | 40 |
| Example 2 | Polymer-B/NR = 20/80 | 265 | 410 | 45 | 52 | 56 | 39 |
| Example 3 | Polymer-C/NR = 20/80 | 272 | 420 | 46 | 53 | 55 | 41 |
| Example 4 | Polymer-D/NR = 20/80 | 260 | 400 | 51 | 55 | 58 | 43 |
| Example 5 | Polymer-D/E-SBR*[1] = 20/80 | 245 | 390 | 45 | 52 | 54 | 41 |
| Example 6 | Polymer-G/NR = 10/90 | 275 | 440 | 50 | 56 | 58 | 43 |
| Example 7 | Polymer-E/NR = 20/80 | 235 | 410 | 40 | 44 | 48 | 49 |
| Example 8 | Polymer-I/E-SBR*[2] = 30/70 | 240 | 410 | 37 | 40 | 41 | 51 |
| Example 9 | Polymer-J/NR = 20/80 | 255 | 420 | 28 | 41 | 45 | 50 |
| Comparative Example 1 | Polymer-A/NR = 70/30 | 210 | 300 | 38 | 43 | 46 | 55 |
| Comparative Example 2 | Polymer-H/NR = 20/80 | 185 | 305 | 37 | 42 | 46 | 60 |
| Comparative Example 3 | Polymer-F/NR = 20/80 | 273 | 430 | 62 | 68 | 72 | 37 |
| Comparative Example 4 | IIR*[3]/NR = 20/80 | 210 | 320 | 48 | 57 | 61 | 57 |
| Comparative Example 5 | High BdSTE-SBR*[4]/NR = 20/80 | 265 | 410 | 48 | 58 | 67 | 39 |
| Comparative Example 6 | Polymer-A/NR = 3/97 | 305 | 510 | 59 | 66 | 70 | 38 |

*[1]Emulsion polymerized SBR (JSR SBR #1500)
*[2]Emulsion polymerized SBR (content of bound styrene = 23.5%, $ML_{1+4}^{100°C.}$ = 110)
*[3]Butyl rubber (JSR Butyl 365)
*[4]Emulsion polymerized SBR having high butadiene content (JSR SBR #0202)

What is claimed is:

1. A vibration insulating material comprising a rubber composition which comprises:
   (A) as rubber components,
      (1) 5-50 parts by weight of a copolymer consisting of 99.5-45% by weight of a conjugated diolefin, 0.5-30% by weight of an ethylenically unsaturated carboxylic acid and 0-40% by weight of another vinyl monomer polymerizable therewith, wherein said copolymer is not a graft polymer, and
      (2) 50-95 parts by weight of at least one rubber selected from the group consisting of natural rubber and synthetic diene rubbers, and
   (B) as a filler, about 50 parts by weight of carbon black.

2. A vibration insulating material according to claim 1, wherein the amount of said copolymer is 10-30 parts by weight.

3. A vibration insulating material according to claim 1, wherein said conjugated diolefin is selected from isoprene, butadiene and pentadiene.

4. A vibration insulating material according to claim 1, wherein the content of said conjugated diolefin is 99-50% by weight.

5. A vibration insulating material according to claim 1, wherein the content of said ethylenically unsaturated carboxylic acid is 1-20% by weight.

6. A vibration insulating material according to claim 1, wherein said ethylenically unsaturated carboxylic acid is selected from acrylic acid, methacrylic acid, itaconic acid, cinnamic acid, fumaric acid and maleic acid.

7. A vibration insulating material according to claim 1, wherein said vinyl monomer is selected from styrene, α-methylstyrene, vinyltoluene, p-methylstyrene, methyl acrylate, butyl acrylate, 2-ethylhexyl acrylate, methyl methacrylate, butyl methacrylate and 2-ethylhexyl methacrylate.

8. A vibration insulating material according to claim 1, wherein said synthetic diene rubber is selected from polyisoprene rubber, styrene-butadiene copolymer rubber, butadiene rubber, acrylonitrile-butadiene copolymer rubber and ethylenepropylene-diene terpolymer rubber.

9. A method for providing vibration insulation comprising molding and vulcanizing a vibration insulating effective amount of a vibration insulating material and using the resulting material as a vibration insulator, wherein said vibration insulating material comprises a rubber composition which comprises:

(A) as rubber components,
   (1) 5-50 parts by weight of a copolymer consisting of 99.5-45% by weight of a conjugated diolefin, 0.5-30% by weight of an ethylenically unsaturated carboxylic acid and 0-40% by weight of another vinyl monomer polymerizable therewith, wherein said copolymer is not a graft polymer, and
   (2) 50-95 parts by weight of at least one rubber selected from the group consisting of natural rubber and synthetic diene rubbers, and
(B) as a filler, about 50 parts by weight of carbon black.

* * * * *